United States Patent [19]
Quinn

[11] 3,892,133
[45] July 1, 1975

[54] STATISTICAL SOUND LEVEL ANALYZER

[75] Inventor: Robert W. Quinn, Swampscott, Mass.

[73] Assignee: The United States of America as represented by the Secretary of the Department of Transportation, Washington, D.C.

[22] Filed: Sept. 13, 1973

[21] Appl. No.: 396,769

[52] U.S. Cl. .................. 73/556; 179/1 N; 324/102; 324/103 R
[51] Int. Cl. ...................... G01r 19/16; G01l 1/00
[58] Field of Search ............ 181/.5 AP, .5; 324/102, 324/103 R, 103 P; 73/556, 557; 343/7 A, 17.1 R; 179/1 N

[56] References Cited
UNITED STATES PATENTS

| | | | |
|---|---|---|---|
| 3,043,055 | 5/1962 | Fine et al. | 324/102 |
| 3,280,937 | 10/1966 | Faber | 181/.5 AP |
| 3,328,705 | 6/1967 | Eubanks | 324/103 R |
| 3,437,927 | 4/1969 | Cornwell, Jr. et al. | 324/103 R |
| 3,483,941 | 12/1969 | Brady | 181/.5 AP |
| 3,696,206 | 10/1972 | Ida | 181/.5 AP |
| 3,697,973 | 10/1972 | Stevens | 181/.5 AP |
| 3,747,703 | 7/1973 | Knowd | 181/.5 AP |

Primary Examiner—Maynard R. Wilbur
Assistant Examiner—G. E. Montone
Attorney, Agent, or Firm—Herbert E. Farmer; Harold P. Deeley, Jr.

[57] ABSTRACT

Disclosed is a statistical sound level analyzer designed to measure sound levels such as the L10 level. The L10 level is defined as the sound level exceeded 10 percent of the time. An audio sensor provides a sensor signal indicative of the amplitude of audio signals received. A threshold device compares the sensor signal with an adjustable threshold signal and provides a test output at a first level if the sensor signal is of a greater amplitude and a test signal of a second level if the threshold signal is of a greater amplitude. Inasmuch as it is the L10 level being sought, the sensor signal should possess the greater amplitude 10 percent of the time. The actual duty cycle of the threshold device is indicated by the average dc voltage of the test signal. The test signal is integrated to find that average and the output of the integrator is offset by a reference signal which is at an ideal voltage level. The difference between the integrated test signal and the reference signal is amplified and is fed back to the threshold device as the threshold signal. Errors in the duty cycle are corrected automatically by adjustments to the threshold signal and the system seeks to maintain a 10 percent duty cycle. The threshold signal is proportional to the L10 level.

10 Claims, 2 Drawing Figures

3,892,133

STATISTICAL SOUND LEVEL ANALYZER

ORIGIN OF THE INVENTION

The invention described herein was made by an employee of the U.S. government and may be manufactured and used by or for the government for governmental purposes without the payment of any royalties thereon or therefor.

BACKGROUND OF THE INVENTION

This invention relates to sound level analyzers and, more particularly, to a statistical sound level analyzer that provides direct measurement of statistical sound indices in the field.

Concentration of population coupled with the proliferation of many relatively noisy work saving devices has made the study of noise pollution an important subject in our society. Controlling noise pollution is becoming even more important as medical science becomes aware of a growing number of adverse effects of noise on human beings.

In order to compare noise pollution existing at one location to that existing at another, and to compare different levels of noise with respect to their effects on persons and thus determine acceptable noise thresholds, it was necessary to agree on standard scales for the quantitative measurement of noise. Inasmuch as the noise level at many locations varies widely during relatively short periods of time, it was realized that something other than peak level had to be used. Furthermore, since, for example, a change in noise level by a factor of two may have physiological effects disproportionate to the two to one level change, it was realized that simple averaging could not be used. The degree of irregularity of the noise level had to be taken into consideration.

Among the sound level indices that were adopted are the L10, L50 and L90 levels. These levels are defined as the sound level exceeded 10, 50 and 90 percent, respectively, of the time. Other levels in common use include the noise pollution level and the traffic noise index. Both of these levels can be computed by various combinations of the L10, L50 and L90 levels. Thus, the key to rapid and accurate statistical noise level analysis is the ability to inexpensively and accurately determine the L10, L50 and L90 levels.

A prior method commonly utilized to determine statistical levels, such as the L10 level, was a graphic method. A recording of noise measured in the field was made on magnetic tape. A graphic representation thereof was made in a laboratory and the L10 level was obtained utilizing a trial and error method coupled with meticulous measurements of the level variations in the graph. Inaccuracies were, of course, caused by the inability to make accurate geometric representations of a sound level recording. Furthermore, accuracy and reproducibility of data from different graphic level recorders is questionable inasmuch as their responses vary. A substantial amount of equipment is required and, since graphical analysis takes place in a laboratory following an on sight sound recording, the statistical level is not immediately known.

Another common method in use involves computers that make determinations from previously prerecorded, or on-line data. A detector receives the recorded noise data and converts the various levels therein to digital outputs. The digital output is read into a computer that determines the desired statistical indices. Unless a fully equipped mobile laboratory is used, a magnetic tape recording must be made in the field when the computer method is utilized. Consequently, subsequent laboratory analysis is required and the sound level is not immediately known. Other disadvantages are that the computer software is expensive to develop or purchase and the computer hardware is also expensive. Furthermore, extensively trained personnel are required when utilizing the computer system.

It is an object of this invention, therefore, to provide a statistical sound level analyzer that is low in cost, can be operated by untrained personnel and provides an immediate measurement of the statistical index sought without the necessity of intermediate data recording.

SUMMARY OF THE INVENTION

This invention is characterized by a statistical sound level analyzer including an audio level sensor that provides a sensor signal indicative of the amplitude of audio signals received thereby. A threshold device receives the sensor signal and compares it to a threshold signal. A test signal is provided by the threshold device and the test signal is at a first level if the sensor signal is of a greater amplitude than the threshold signal and the test signal is at a second level if the threshold signal is greater. A signal comparing integrator receives the test signal and measures the duty cycle thereof. Assume, for example, that the L10 level is being sought. Since the L10 level is the level that is exceeded 10 percent of the time, the test signal should have a duty cycle of 10 percent. The integrator supplies the threshold signal to the threshold device via a feedback loop and, in response to the duty cycle comparison, adjusts the threshold signal as necessary to make the actual duty cycle approach the ideal. Consequently the integrator constantly seeks to maintain the threshold signal at a level that is proportional to the sound L10 level. Therefore, various output devices, such as meters or recorders, can be utilized to provide an immediate indication of the L10 level. It will be appreciated that other levels, such as the L50 level, can be determined simply by altering the ideal duty cycle programmed into the integrator. Consequently, a light weight, inexpensive apparatus is provided that yields immediate measurements of statistical sound levels in the field.

Inasmuch as the test signal is restricted to only two levels, the average dc voltage thereof is indicative of the duty cycle. The integrator comparator includes an energy storage capacitor and it determines the average dc voltage of the test signal. The integrator is programmed with the ideal duty cycle by feeding thereto a signal of an amplitude corresponding to the amplitude of the test signal after the ideal duty cycle is achieved. Thus, the system is programmed to determine the different statistical indices, as indicated by different duty cycles, by simply changing the reference signal supplied to the integrator. A more detailed description of system operation will be given below.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
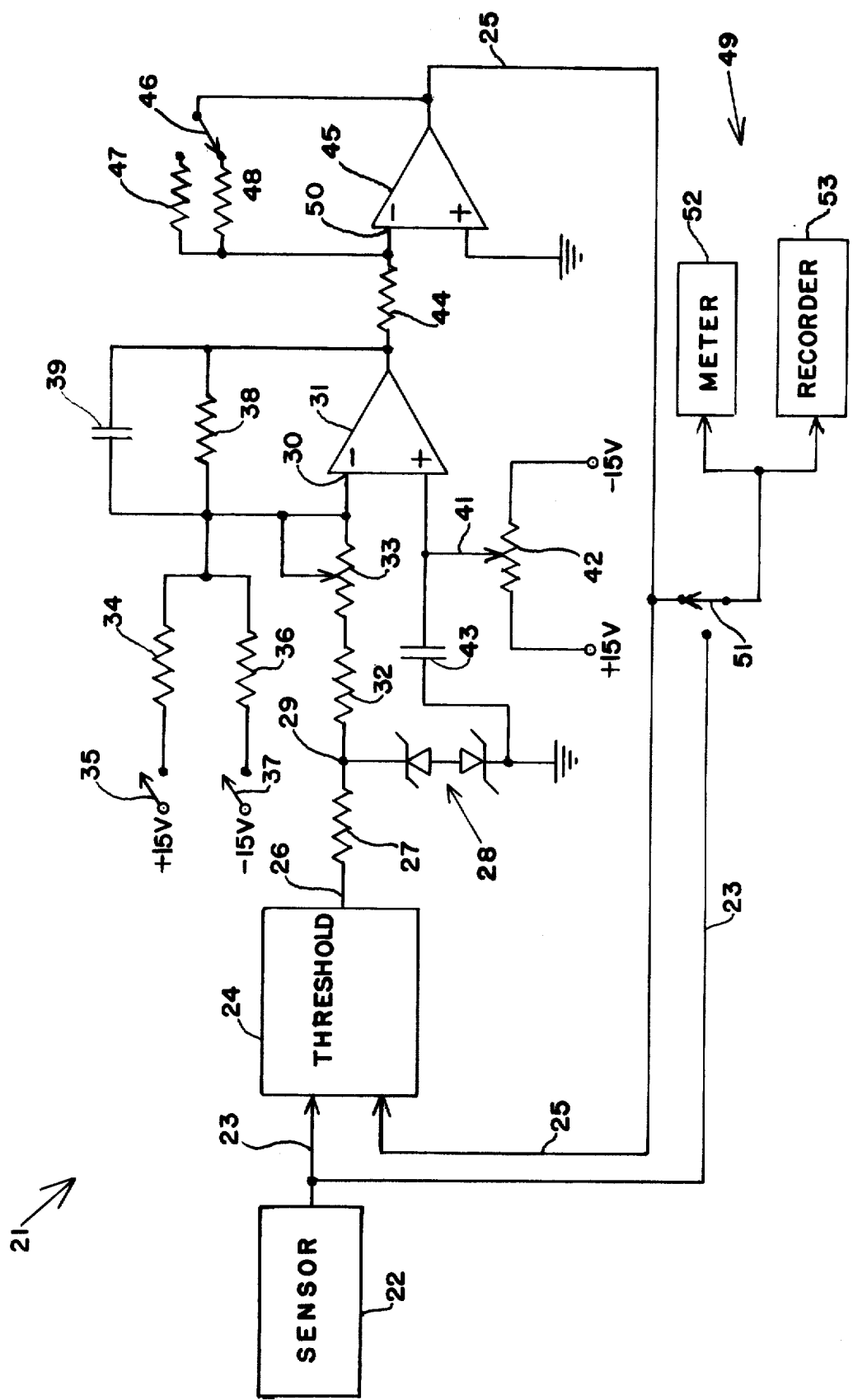
FIG. 1 is a schematic diagram of a preferred statistical sound level analyzer.

Referring first to FIG. 1 there is shown a sensor system 21 comprising an audio level sensor 22 that provides a sensor signal on a line 23 indicative of the level of audio signals received. The line 23 is coupled to one input of a threshold device 24 that receives a threshold signal in another input via a line 25. The threshold device provides an output of a first level on a line 26 if the sensor signal on the line 23 exceeds that on the line 25. An output of a second level is provided on the line 26 if the threshold signal on the line 25 exceeds the sensor signal on the line 23. The line 26 is coupled by a resistor 27 to a two level voltage limit circuit 28 composed of two series wired anode to anode zener diodes. Thus when any voltage is present at a junction 29, one of the diodes is forward biased and the other is reversed biased. Consequently, the voltage at the junction 29 is limited in accordance with the voltage rating of the zener diodes. The junction 29 is coupled to the negative input 30 of an operational amplifier 31 by a fixed resistor 32 and a variable resistor 33, which are in series. Also connected to the negative input 30 of the amplifier 31 is a fixed resistor 34 that is selectively coupled to a positive 15 volt source by a switch 35. Another fixed resistor 36 is also coupled to the negative input 30 of the amplifier 31 and is selectively coupled to a negative 15 volt source by a switch 37. Spanning between the output of the amplifier 31 and the negative input 30 are a fixed resistor 38 and energy storage capacitor 39. Thus, the amplifier 31 is wired as an energy source integrator. The gain of the integrator is fixed by the value of the resistor 38. Variable resistor 33 adjusts the integrator time constant.

The positive input terminal of the amplifier 31 receives a reference signal from the center tap 41 of a reference signal potentiometer 42 that spans between the positive 15 and negative 15 volt sources. Consequently, it will be appreciated that the integrator amplifier 31 functions as a comparator. Furthermore, the positive input of the amplifier 31 is coupled to ground by a filter capacitor 43 that eliminates voltage surges.

The output of the amplifier 31 is coupled by a resistor 44 to the negative terminal 50 of another operational amplifier 45. The output of the operational amplifier 45 is selectively coupled by a switch 46 to one of two resistors 47 and 48 that are of different values and are coupled to the negative input 50 of the amplifier. Furthermore, the output of the amplifier 45 is coupled to the feedback line 25 and is, in fact, the threshold signal.

An output circuit 49 is selectively coupled to the line 25 or the line 23 by switch 51. The output circuit then provides signals to the meter and the recorder output jack.

Figure 2:
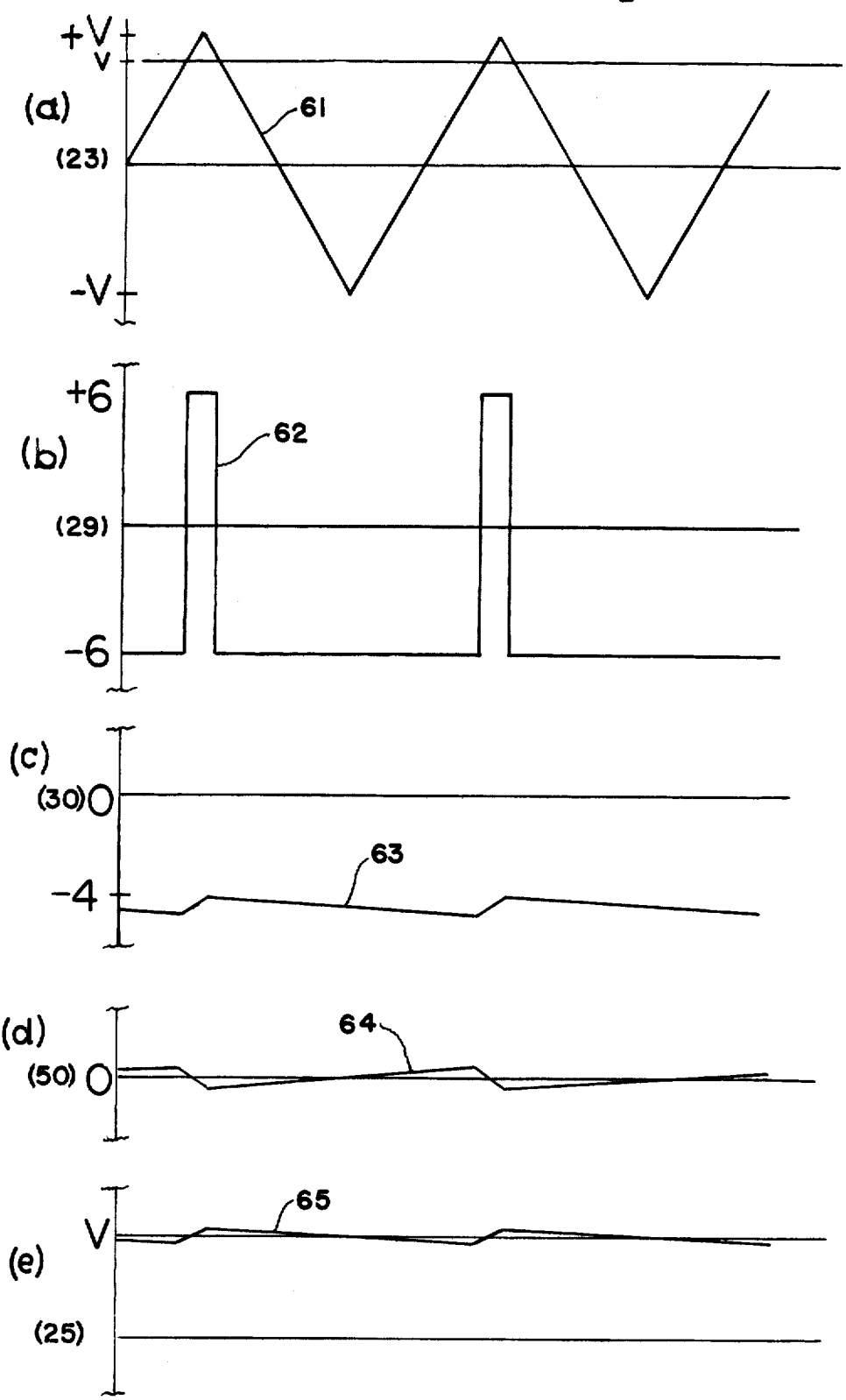
FIG. 2 shows a plurality of waveforms present at different points in the circuit shown in FIG. 1.

Operation of the sensor system 21 can best be understood with reference to FIGS. 1 and 2.

For simplicity, it will be assumed during the explanation of operation that the sensor 22 is receiving a triangularly shaped waveform and thus providing a triangularly shaped sensor signal on the line 23 as indicated by a waveform 61 in FIG. 2a. As shown in FIG. 2a, the waveform 61 alternates between the level of V and minus V volts. If it is assumed that at this time the system 21 is equilibrated and measuring the L10 level, the threshold signal on the line 25 will be approximately at the level of $v$.

It will be recalled that the threshold device 24 provides an output at the first level on the line 26 when the sensor signal on the line 23 exceeds the threshold signal on the line 25. If it is assumed, for example, that the voltage rating of the zener diodes is 6 volts and that the first level is a positive voltage that exceeds that voltage rating it will be appreciated that the voltage at the junction 29 will be 6 volts when the sensor signal exceeds the threshold signal. Conversely, the voltage at the junction 29 will be minus 6 volts when the threshold signal exceeds the sensor signal. This relationship is shown by a waveform 62 in FIG. 2b.

Recalling that it was assumed that the system 21 is equilibrated to detect the L10 level, it is realized that, by definition, the sensor signal exceeds the threshold signal 10 percent of the time. Thus, the signal at the junction 29 is plus 6 volts 10 percent of the time and minus s6 volts 90 percent of the time. The one to nine relationship will hold true even if the signal 61 is irregular rather than the simple triangular waveform. However, the 1 to 9 relationship resulting from an irregular waveform would not be visually appreciated as easily as is that relationship in the waveform 62.

The signal at the junction 29 is filtered by the integrator circuit 31 to provide a signal at the negative junction 30 that is represented by a waveform 63 in FIG. 2c. It will be appreciated that the one to nine relationship, or 10 percent duty cycle, at the junction 29 provides an average dc voltage at the input 30 of negative 4.8 volts. The operational amplifier 31 being connected as an integrator causes the discrete charge and discharge portions shown in the waveform 63 to be linear. After equilibration, when the capacitor 39 is charging, the voltage at the junction 29 is 6 volts. Thus the voltage differential causing that charge is six volts minus negative 4.8, or 10.8 volts. When the capacitor 29 is discharging the voltage differential causing discharge is only 1.2 volts. Accordingly, charging proceeds at a rate nine times faster than discharge as represented by the relative slopes in the waveform 63. Therefore a ten percent duty cycle maintains an average of negative 4.8 volts. It should be emphasized that the slopes in the waveform 63 in FIG. 2c are greatly exaggerated for clarity. In practice, while the voltage at the terminal 30 does cycle above and below negative 4.8 volts it is far more constant than shown in the waveform 63.

The reference signal potentiometer 42 is set so that the voltage applied to the positive terminal of the integrator 31 is negative 4.8 volts. Consequently, the output of the integrator 31 is the difference between a fixed reference signal of negative 4.8 volts and the signal represented by the waveform 63 that oscillates but is centered at negative 4.8 volts. That signal, which is applied to the input 50, maintains the ac component of the waveform 63 but is at an average of approximately zero volts and is shown by a waveform 64 in FIG. 2d. (The slopes in the waveform 64 are also greatly exaggerated for clarity.)

For reasons to be explained below, the signal at the input 50, and thus the waveform 64, is not of a true zero average value. The dc average of the waveform 64 is a very small absolute value. Thus, when the signal at the input 50 is amplified by the high gain amplifier 45, the threshold signal on the line 25 is of the average positive value $v$ with an ac component impressed thereon as shown by a waveform 65 in FIG. 2e. The ac component (i.e. slope) of the waveform 65 is also exaggerated, but not to so great an extent as was the case with the waveforms 63 and 64.

The reason that the signal at the input 50 is not truly of zero average value is as follows. If the signal at the input 50 were truly of a zero average value, the threshold signal on the line 25 would be of zero average value thus the level $v$ in FIG. 2a would fall to zero. If that were to happen the threshold device 24 would produce an output at the first level for a greater proportion of the time than 10 percent. Such an increased duty cycle would cause the average voltage at the input 30, as represented by the waveform 63, to increase. It is this increase at the input 30 that causes the signal at the input 50 to assume an average value other than zero and drive the level $v$ in the wave form 61 to the position shown in FIG. 2a. However, it will be appreciated that only a small increase in voltage at the terminal 50 is necessary due to the high gain of the amplifier 45. Consequently the increase in the average voltage at the input 30 is so small that the error in the duty cycle required to produce it is a negligible fraction of one percent. Thus, the signal at the input 50 is very near zero volts and the signal at the input 30 can be considered negative 4.8 volts.

It will be apparent from the above discussion that if the duty cycle of the threshold device 24 is too short, the voltage disparity at the inputs of the amplifier 31 causes a change at the input 50 to lower the threshold signal and lengthen the duty cycle. Conversely, if the duty cycle is too long, the voltage at the input 30 is changed to shorten the duty cycle.

The charging time constant of the energy storage capacitor 39 must be relatively long in order that effective averaging be provided to insure a stable signal with little ac component on the line 25. Thus, settling time required when the circuit is initially energized becomes a problem. Since the voltage at the junction 29 is always plus or minus 6 volts, a knowledge of the desired duty cycle permits one to easily calculate the approximate quiescent voltage on the capacitor 39. Accordingly, prior to system operation, the desired capacitor voltage is calculated and either the switch 35 or the switch 37 is activated to precharge the capacitor to approach that voltage level and reduce settling time. An on-scale meter reading is an indication that capacitor 39 is charged properly. The charging rate of the capacitor 39 during system operation is further influenced by the gain of the amplifier 45. That gain is set to one of the two values provided by the resistors 47 and 48 prior to system operation. The advantage of high gain is, of course, that the system responds and equilibrates to the operating conditions more rapidly. However, if the signal to be analyzed is highly irregular, high gain will provide too large of an ac component on the line 25. Thus, the low gain setting of the switch 46 may be used if a highly irregular signal is being analyzed.

It has been shown that the circuit responds by seeking to charge the capacitor 39 to a level that approximates the reference voltage supplied by the terminal 41 of the potentiometer 42. At equilibrium, the difference between the capacitor charge and the voltage at the terminal 41 depends upon the gain of the amplifier 45 and will typically be a few millivolts. Consequently, it will be appreciated that if a different sound level is sought, as for example, the L50 level, the voltage on the terminal 41 is changed. In the example given above, with the two levels provided at the terminal 29 being plus 6 volts and minus 6 volts, the L50 level requires that the voltage at the terminal 41 be zero. Following the adjustment of the reference voltage at the terminal 41 to the zero level, the system itself seeks to retain the capacitor 39 at zero charge. When the charge in the capacitor 39 is substantially zero, the duty cycle of the threshold device is 50 percent. The L90 level would require that the voltage at terminal 41 be at positive 4.8$v$.

It will, of course, be appreciated that the sensor signal on the line 23 is directly proportional to the audio signal received contemporaneously. Furthermore, the threshold signal on the line 25, when the system 21 has equilibrated, is equal to the given statistical level of the signal on the line 23. Thus, the threshold signal on the line 25 is proportional to the statistical level of the stimulus being sensed by the sensor 22. The constant factor involved in the proportion is the gain of the sensor 22. Consequently, with proper calibration, the selected statistical index can be read directly from the meter 52 and/or recorded by the recorder 53.

It will be realized that where specific voltages are mentioned above they are mentioned by way of example only. It is realized, for example, that operational amplifiers 31 and 45 supplied by different manufacturers may necessitate the utilization of different voltage levels.

Obviously, many modifications and variations of the present invention are possible in light of the above teachings. For example the sensor 22 could sense stimuli other than audio signals, and therefore provide a measure of the statistical index of whatever stimulus is being used as an input, (i.e. temperature, humidity, velocity, weight, force, etc.). And by providing an RMS detector preceding the threshold device, all Audio sensing units now on the market with an ac output could be used to provide stimuli to the instrument, not just those with a dc output. Also, the RMS detector could have an attenuator with gain steps of 0, 10, 20 dB. This will allow the operator to observe the fluctuating levels by monitoring the meter of the sensing unit while the statistical index is being measured by the SSLA. (Statistical Sound Level Analyzer). And the SSLA meter could be scaled to provide a calibrated range from $-10$ to $+10$ dB with a range switch to shift it up and down by 5 dB without affecting the equilibrium of the duty cycle controlling the feedback loop. This will allow the operator to set the meter circuit to the most accurate part of the scale without having to again wait for averaging and thereby eliminating a delay of 10 or 20 minutes before meaningful readings can be taken. It is to be understood, therefore, that the invention can be practiced otherwise than as specifically described and remain within the spirit and scope of the claims.

What is claimed is:

1. A sensor system comprising:
   a sensor for providing a sensor signal indicative of the amplitude of a preselected stimulus;
   threshold means for comparing an adjustable threshold signal to the sensor signal and providing a test signal with an amplitude of a first level if the sensor signal exceeds the threshold signal and of a second level if the threshold signal exceeds the sensor signal, whose duty cycle is indicative of the percent of time that the sensor signal exceeds the threshold signal;

comparator means for receiving the test signal and comparing the duty cycle thereof to a predetermined ideal duty cycle, and wherein said comparator means generates an error signal which responds to the duty cycle comparison by adjusting the threshold signal as required to cause the duty cycle of the test signal approach the ideal preselected duty cycle; and output means for sampling the threshold signal, which is indicative of the level exceeded by the sensor signal a percentage of the time equal to the present ideal duty cycle, and providing an output indicative thereof.

2. A system according to claim 1 wherein said threshold means comprises a two-level voltage limit means for restricting the test signal to two predetermined levels so that the average dc voltage of the test signal is proportional to the duty cycle of the best signal and wherein said comparator means comprises voltage sensitive means for receiving the test signal and an integrator for converting the test signal to a dc voltage proportional to its duty cycle.

3. A system according to claim 2 comprising reference signal means for supplying a reference signal to said comparator means, wherein the reference signal is representative of the ideal duty cycle and wherein said comparator means comprises voltage comparator means.

4. A system according to claim 3 wherein said reference signal means comprises variable reference signal means for supplying a variable reference signal.

5. A system according to claim 3 wherein said voltage sensitive means comprises energy storage means for averaging the test signal.

6. A system according to claim 5 wherein said energy storage means comprises an integrator.

7. A system according to claim 6 wherein the charging time constant of said integrator is variable and relatively long.

8. A system according to claim 6 wherein said output means comprises a meter.

9. A system according to claim 6 wherein said output means comprises a dc output for use with an external dc recorder.

10. A system according to claim 6 wherein said sensor is an audio level sensor.

* * * * *